Sept. 6, 1949.  F. P. DAVIES ET AL  2,481,203
GOTHIC ARCH TRACING DEVICE
Filed Nov. 29, 1946
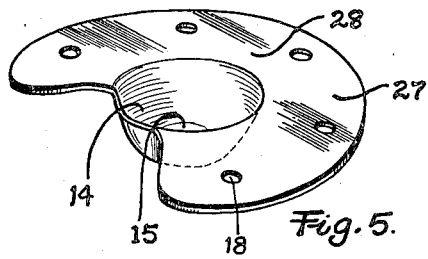
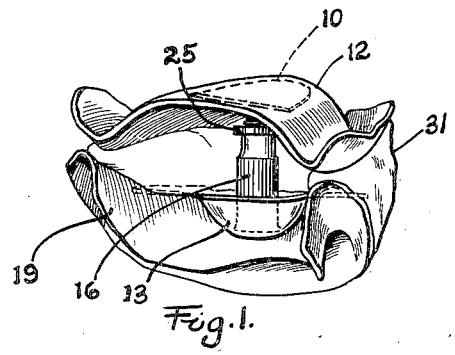
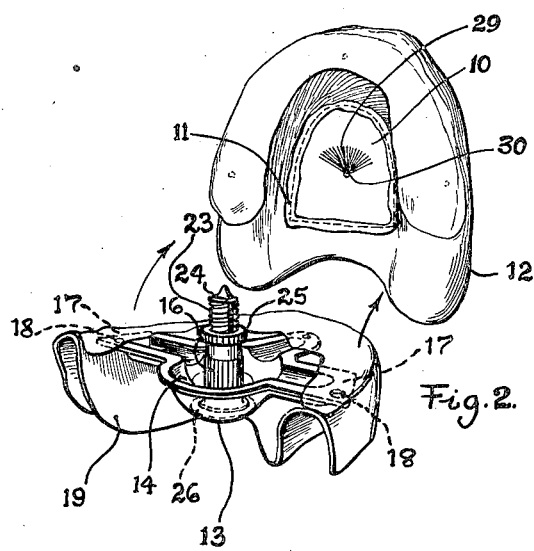
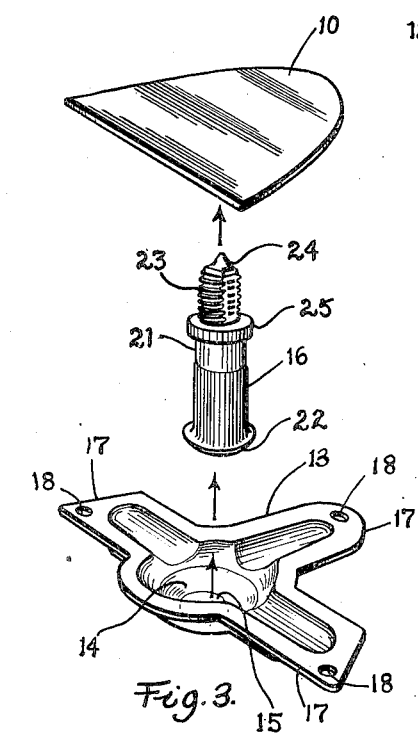
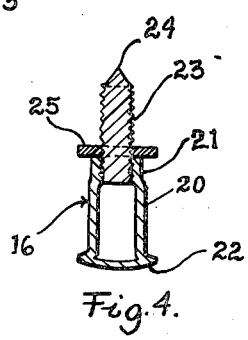
INVENTOR.
Frank P. Davies and
Maurice Y. Nicole
BY *Clarence E. Threedy*
Their Attorney.

Patented Sept. 6, 1949

2,481,203

UNITED STATES PATENT OFFICE 2,481,203

GOTHIC ARCH TRACING DEVICE

Frank P. Davies and Maurice Y. Nicole, San Francisco, Calif.; said Frank P. Davies, deceased, assignor, by decree of distribution and assignment, to said Maurice Y. Nicole Application November 29, 1946, Serial No. 713,030

2 Claims. (Cl. 32—19)

This invention relates to Gothic arch tracing devices.

More particularly, the invention relates to and, as a principal object, aims to provide, a tracing device especially designed and adaptable for use in obtaining centric relation (in harmony with vertical dimension) on any single edentulous ridge; that is, to articulate against an opposing ridge, containing all or part of any combination of remaining teeth, be they natural or artificial and irrespective of whether the edentulous ridge be the upper or lower ridge.

Another and equally important object of our invention is to provide in such a device a well or central depression which permits the base of a stylus to be supported therein within the mouth below the crest of the edentulous ridge, thereby allowing more room in the mouth for the devices, especially necessary in cases of close bite.

Another and equally important object of the invention is the provision, in a device of the character hereinbefore referred to, of a stylus capable of calibration adjustment in millimeter measurements to facilitate accurate measurement and determination of the decrease or increase of the vertical dimension desired; also to provide for latching the stylus in this vertical adjustment.

A further object of the invention is to provide a tracing plate on which to inscribe by marking "the Gothic arch" in clear, sharp and discernible outline without the use of paint, wax or smoked surface, or any other medium.

Another object is the provision of a device, of the character hereinbefore referred to, designed for the above stated use, to obtain a smooth and harmonious relation in all working conditions of a patient's lower in relation to the upper jaw, whether the artificial teeth be produced in the form of a full denture in opposition to a full denture, a full denture against a partial, or a full denture against any combination of natural teeth.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of upper and lower trial denture plates showing the invention associated therewith;

Fig. 2 is a perspective view of the plates illustrated in Fig. 1 showing the same in exploded relation with respect to each other;

Fig. 3 is a perspective view of the devices embodying the invention showing certain parts thereof in exploded relation with respect to each other.

Fig. 4 is a sectional detail view of the stylus embodied in the invention; and

Fig. 5 is a perspective view of a stylus supporting plate illustrating a modified form of construction.

The several objects of our invention are accomplished by the preferred form of construction shown and illustrated in the accompanying drawings and which construction will now be described more in detail.

Fig. 3 illustrates the Gothic arch tracing device embodying our invention as comprising a tracer plate 10 adapted to be secured to the palate surface 11 of the upper trial denture plate 12 by means of wax or other suitable securing material.

A stylus supporting plate 13 is provided with a depression or well 14, the medial portion of the bottom wall of which provides a stylus seat 15 of a well defined area so as to properly locate the stylus 16 in vertical position with respect to the plate 13.

This plate 13, in the form shown in Fig. 3, is designed for use in connection with full dentures and, as shown, is formed substantially T-shaped in cross section with each limb 17 thereof provided with anchoring openings 18 whereby, when the plate 13 is secured to the lower trial denture plate 19 by means of wax or the like, it will be firmly held in proper relationship with respect to this plate 19.

The stylus 16 comprises a sleeve 20 having a thread bearing reduced portion 21 and having a base portion 22 shaped to conform to the seat 15.

Threaded into the sleeve 20 is the tracer pin 23 having a tracer head 24. The pin 23 is latched in an adjusted position with respect to the sleeve 20 by means of a lock nut 25. The base 22 of the sleeve 20, when mounted in the seat 15, is self-locating with respect to the plate 13 and, in practice, is removably secured thereto by means of wax 26 or other connecting material.

The plate 27 illustrated in Fig. 5 is designed especially for use with partial denture trial plates and, for this purpose, it is desirable that the plate 27 provide a greater securing area 28. This plate 27 otherwise is substantially of the same structure as the plate illustrated in Fig. 3 with like numerals designating corresponding parts of the two plates.

With the tracer plate 10 attached to the trial denture plate 12, and with the stylus supporting plate 13, with the stylus thereon secured to the trial denture plate 19, the two plates are inserted in the mouth of the patient, after which the stylus 16 is adjusted to the vertical dimension most comfortable to the patient. This will bring the tracer pin 23 into contact with the tracer plate 10. The patient is requested to exercise the lower jaw relative to the upper jaw in all its masticating movements, thereby to inscribe upon the tracer plate 10 the "Gothic arch" 29.

After this performance, the plates are removed from the patient's mouth, and at an apex of the arc, there is pressed by a tool, such as a punch or the like, a small impression 30, which thereafter is utilized to locate the trial plates in adjustment of the dental articulator well known by dental technicians.

To facilitate adjustment of the articulator, the trial plates, properly located with respect to each other by the stylus pin engaging the impression, are secured together by plaster Paris or other material, indicated at 31.

From the foregoing description, it will be apparent that we have provided a Gothic arch tracing device comprising relatively few parts and one which will be especially useful in defining the Gothic arch to obtain proper centric relation in harmony with vertical adjustment on any single edentulous ridge, be it the upper or lower ridge, that is, to articulate against an opposite ridge containing all or part of any combination of remaining teeth, be they natural or artificial.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. A device of the class described including a stylus supporting plate having a well formed therein with a seat provided in the base of the well, a stylus having a base conforming to the seat whereby said stylus is self-located within said well and said base being adapted to be secured to said seat in said well by wax or other like material, and a tracer plate engageable by said stylus.

2. A device of the class described including a stylus supporting plate having a well formed therein with a seat provided in the base of the well, a stylus having a base conforming to the seat whereby said stylus is self-located within said well and said base being adapted to be secured to said seat in said well by wax or other like material, and a tracer plate engageable by said stylus, said stylus comprising a sleeve, a tracer pin threaded in said sleeve for adjustment longitudinally with respect to said sleeve, and a lock-nut threaded on said pin and adapted to engage said sleeve to lock said pin in a longitudinal adjusted position with respect to said sleeve.

FRANK P. DAVIES.
MAURICE Y. NICOLE.

REFERENCES CITED

The following references are of record in the file of this patent:

UNITED STATES PATENTS

| Number | Name | Date |
|---|---|---|
| 2,027,373 | Eaten | Jan. 14, 1936 |
| 2,183,512 | Brenner | Dec. 12, 1939 |
| 2,389,063 | Lang | Nov. 13, 1945 |